United States Patent [19]

Krupp et al.

[11] Patent Number: 4,842,922

[45] Date of Patent: Jun. 27, 1989

[54] POLYETHYLENE FIBERS AND SPUNBONDED FABRIC OR WEB

[75] Inventors: Stephen P. Krupp; Edward N. Knickerbocker; John O. Bieser, all of Lake Jackson, Tex.

[73] Assignee: The Dow Chemical Company, Midland, Mich.

[21] Appl. No.: 114,169

[22] Filed: Oct. 27, 1987

[51] Int. Cl.$^4$ .................. D04H 3/03; C08L 23/06; C08L 23/08; C08L 23/18

[52] U.S. Cl. .................. 428/198; 428/288; 428/296; 264/DIG. 26; 264/75; 264/210.8; 525/240

[58] Field of Search .............. 525/240; 264/DIG. 26, 264/210.8; 428/198

[56] References Cited

U.S. PATENT DOCUMENTS

| | | | |
|---|---|---|---|
| 4,076,698 | 2/1978 | Anderson et al. | |
| 4,429,079 | 1/1984 | Shibata et al. | 525/240 |
| 4,438,238 | 3/1984 | Fukushima et al. | 525/240 |
| 4,578,414 | 3/1986 | Sawyer et al. | |
| 4,584,347 | 4/1986 | Harpell et al. | 525/240 |
| 4,644,045 | 2/1987 | Fowells | |
| 4,705,829 | 11/1987 | Kwack et al. | 525/240 |

FOREIGN PATENT DOCUMENTS

| | | |
|---|---|---|
| 154197 | 9/1985 | European Pat. Off. |
| 85101380.5 | 9/1985 | European Pat. Off. |
| 57-059943 | 4/1982 | Japan |

*Primary Examiner*—Carman J. Seccuro
*Attorney, Agent, or Firm*—Walter J. Lee

[57] ABSTRACT

Blends of high molecular weight linear polyethylene and low molecular weight linear polyethylene provide improved fiber-forming capabilities over that found with either polymer taken alone. Preferably at least one of the polymers used in the blend is a linear low density polyethylene, LLDPE, which is a linear polyethylene comprising ethylene copolymerized with an amount of a higher alpha-olefin which causes the density of the copolymer to be less than that of a homopolymer made using the same process and catalyst. The higher alpha-olefin can be at least one in the $C_3$–$C_{12}$ range, preferably in the $C_4$–$C_8$ range.

9 Claims, No Drawings

POLYETHYLENE FIBERS AND SPUNBONDED FABRIC OR WEB

FIELD OF THE INVENTION

Improvements are made in the making of fibers and fibrous products from high molecular weight linear polyethylene, especially linear polyethylene which contains at least one higher olefin copolymerized with ethylene.

BACKGROUND OF THE INVENTION

Linear low density polyethylene (LLDPE) is an ethylene polymer prepared using a coordination catalyst in the same manner used in preparing linear high density polyethylene (HDPE), and is actually a copolymer of ethylene and at least one higher alphaolefin. The expression "linear polyethylene" thus includes those which have from 0% to about 30% of at least one higher alpha-olefin of 3 to 12 carbon atoms copolymerized with the ethylene, and it will be understood that the linear polyethylenes which contain a positive amount of at least one higher alpha-olefin will, because of the presence of the higher alpha-olefin in the polymer chain, have a lower density than those which contains none of the comonomer.

It is known from EPO No. 85 101380.5 that linear low density polyethylene (LLDPE) can be made into fibers by melt-spinning and that even very fine fibers can be produced. This EPO publication is incorporated herein by reference.

It is known from U.S. Pat. No. 4,578,414 that wettable fibers of polyethylene, including LLDPE, can be prepared from polyethylene having incorporated therein certain wetting agents.

The manufacture of LLDPE is disclosed, e. g., in U.S. Pat. No. 4,076,698, which discloses that the LLDPE can be extruded as a monofilament and then cold drawn. It is shown as being a copolymer of ethylene and at least one other higher alpha-olefin. The density of the LLDPE is dependent on the chain length and amount of the higher alpha-olefin in the copolymer.

Whereas LLDPE has been introduced in the market place as a polymer suitable for making fibers, it has been determined that not all versions and varieties of LLDPE are entirely adequate for commercial production of spun-bonded fibers and the fabric strength of spun-bonded fabrics has generally been significantly less than fabrics made from spun-bonded polypropylene fibers. It is disclosed in recent U.S. Pat. No. 4,644,045 that there is a very narrow critical range of LLDPE properties which is suitable for making spun-bonded webs; this U.S. Pat. No. 4,644,045 is incorporated herein by reference, especially in reference to its disclosure of ways of measuring various polymer properties.

It is recognized in the art of making LLDPE polymers that the density of the LLDPE is affected by the amount and kind of olefin comonomer which is copolymerized with the ethylene and, to some extent, by the process conditions and catalyst used. A given mole % of, say, propylene in the copolymer will reduce the density of the polyethylene less than the same mole % of a higher olefin comonomer. The MFR (melt flow rate) is also affected to some degree by the kind and amount of olefin comonomer in the copolymer, and is also affected to some extent by the coordination catalyst used, the polymerization conditions, and/or by any telogens or chain regulators or other reactants which may be present during polymerization.

It is also recognized in the art that there are important distinctions between linear polyethylenes (which includes LLDPE polymers), and branched-chain ethylene polymers, which are made using a free-radical catalyst and are generally referred to as LDPE (low density polyethylene), and were also known in the past as ICI-type polyethylene and as HPPE (high pressure polyethylene). This disclosure deals with linear polyethylenes.

We have now found that blends of linear polyethylene, especially LLDPE, having certain properties, are surprisingly well suited for making spun-bonded webs and yield products having strengths more competitive with those attainable in spun-bonded webs of polypropylene, and furthermore the blends are also particularly well suited for making other forms of fibers such as staple fibers and products made from such other fibers.

SUMMARY OF THE INVENTION

In one aspect, the invention is perceived as a means for improving the fiber-making capability of high molecular weight linear polyethylene, especially LLDPE polymers, by blending it with a low molecular weight linear polyethylene.

In another aspect it is perceived as a blend of high and low molecular weight linear polyethylenes, especially LLDPE, said blend being particularly well suited for spunbonding in commercial operations.

In yet another aspect, it is perceived as a means for improving the strength of spunbonded webs and fabrics of linear polyethylene, by using a blend of high molecular weight linear polyethylene and low molecular weight linear polyethylene, especially where either one or both of the polymers are of the LLDPE variety. Most preferably, both of the linear polymers are of the LLDPE variety.

Blends wherein a high molecular weight linear polyethylene, especially LLDPE, and a low molecular weight linear polyethylene, especially LLDPE, are uniformly blended and used in making fibers, are found to exhibit not only the good hand, softness, and drape which one might expect of a linear polyethylene, especially the LLDPE variety, but a spun-bonded web (fabric) of surprisingly high strength is produced at spinning rates which are very suitable for commercial operations.

The LLDPE resin used for the high molecular weight portion of the blend of the present invention can be any which contains an amount of a $C_3$ to $C_{12}$ olefin comonomer, copolymerized with the ethylene, sufficient to yield a density in the range of about 0.91 g/cm$^3$ to about 0.96 g/cm$^3$, and has a MFR of less than 25 g/10 min., preferably less than about 20 g/10 min. Preferably, the comonomer is a $C_4$ to $C_8$ olefin, such as butene-1, hexene-1, 4-methyl pentene-1, octene-1, and the like, especially octene-1, and can be a mixture of olefins such as butene/octene or hexene/octene. The above stated MFR ranges also apply to linear polyethylenes which contain no comonomer.

The LLDPE resin used for the low molecular weight portion of the present blend can be any which contains an amount of $C_3$ to $C_{12}$ olefin comonomer, copolymerized with the ethylene, sufficient to yield a density in the range of about 0.91 g/cm$^3$ to about 0.96 g/cm$^3$, and has a MFR of greater than 25 g/10 min. preferably greater than about 40 g/10 min. Preferably, the comonomer is a $C_4$ to $C_8$ olefin, such as butene-1, hexene-1, 4-methyl pentene-1, octene-1 or the like, especially octene-1, and can be a mixture of olefins such as butene/octene or hexene/octene. The above stated MFR ranges also apply to linear polyethylenes which contain no comonomer.

DETAILED DESCRIPTIONS INCLUDING THE BEST MODE

The melt flow rate (MFR) of the polymers is measured in accordance with ASTM D-1238 using Condition E (AKA 190/2.16) unless otherwise specified and is a measurement of the amount (grams of melted polymer which is extruded from the orifice of the melt index barrel in 10 minutes. The MFR, often referred to as melt index (MI), is an indication of relative molecular weight, with a given MFR numerical value indicating a higher molecular weight than a greater MFR numerical value.

Cone die melt flow (here called "CDMF") is a measurement made in a similar manner as MFR except that the melt indexer is modified so that the "barrel" through which the polymer is extruded is that of a 90° angle conical die and has a smaller orifice, and the weight applied to the polymer to extrude it through the orifice is less than the 2.16 kilograms of Condition E of ASTM D-1238. The measurement of cone die melt flow is disclosed in the U.S. Pat. No. 4,644,045 discussed above; the patent discloses that a cone die melt flow of between about 65 and 85 grams/ten minues is one of the critical properties required of a LLDPE polymer in order to be spunbonded.

The tensile strength of thermally bonded webs (fabrics) is measured on 1-inch by 4-inch (2.54 cm by 10.16 cm) samples normalized to 1-ounce/yard$^2$ (about 33.9 gm/m$^2$) as "grams force at break". The tenacity of fibers is measured as "grams/denier".

It has been found to be difficult to make spunbonded webs (fabrics) of linear polyethylene (including LLDPE), especially at the high production rates normally desired in commercial operations, which have more than about 50% of the tensile strength (tenacity) of fabrics obtained in spunbonded polypropylene. Greater strength of spun-bonded linear polyethylene, including LLDPE, is desirable in various products, such as diaper cover stock, medical garments, feminine hygiene products and the like.

Since spun-bonded fabrics have continuous filaments splayed down over a substrate, such as a moving belt, using a melt drawn system with air as the motive force, the requirements for a resin which can undergo this melt draw are quite demanding. These include, e. g., (a) about 1.0 to about 1.2 grams/minute/hole throughput rates, (b) linear spinning velocities of at least about 3500, preferably as much as about 4000 or more, meters per minute, (c) fine diameter fibers corresponding to a denier/filament size of less than 3.0, preferably as small as about 2.5 or smaller, (larger denier/filament sizes are more easily obtained by many polymers), and (d) air pressure sufficient to assure random fiber distribution.

This rapid draw-down of the filaments into fine diameter fibers under these desirable conditions makes spunbonding with a relatively high molecular weight resin very difficult. While it is already realized that increasing molecular weight of a polymer results in an increased tenacity of articles formed from that resin, the increased molecular weight also results in much greater spunbonded processing problems. That is, the higher molecular weight linear polyethylenes (including LLDPE) resins are not well suited for spunbonding at commercially viable and economical rates. What has not been known, other than the selection of a very narrow range of properties of the LLDPE shown in the '045 patent discussed above, is that there are unexpected benefits obtained by blending a low molecular weight LLDPE with a high molecular weight LLDPE, especially in spunbonding of the polymers.

For purposes of describing the present invention, a linear polyethylene, (including LLDPE) having a MFR value of less than 25, preferably less than about 20, especially less than about 5, and as low of about 0.5, is considered to be in the high molecular weight range; the lower the MFR value, the higher is the molecular weight. Linear polyethylene having a MFR value in the range of 25–40 may, in some aspects, be considered to be an "intermediate" molecular weight range, but in relating the present invention, it is considered as being on the "high" end of the low molecular weight range. Linear polyethylene having a MFR in the range above about 40, especially above about 45, is considered to be in the low molecular weight range and is not considered (in relating the present invention) to be in an "intermediate" molecular weight range. Whereas MFR values exceeding about 300 can be used as the low molecular weight resin, especially if the high molecular weight portion of the present blend has a MFR value below about 1 or 2, it is preferred that the MFR values of the low molecular weight resin be not more than about 300, preferably not more than about 250. Above about 250–300 MFR, one might encounter problems such as diminished melt strength properties. In a general sense, one should consider that the lower the MFR value of the high molecular weight resin, the greater the need to blend it with an off-setting amount of a linear polyethylene having a high MFR value as the low molecular weight resin.

One can calculate the MFR values and the density values of the polymers used in the blends of the present invention and obtain values which are reasonably close to the actual values one obtains by actual measurement of the blend.

The following formula may be used to calculate the melt index of polymer blends:

ln blend = (fraction A)ln A + (fraction B) ln B

The following formula may be used to calculate the density of polymer blends:

$\rho$blend = (fraction A)$\rho$A + (fraction B)$\rho$B

The present invention (which employs, in a blend, an amount of low molecular weight linear polyethylene which is effective in overcoming the deficiences of high molecular weight linear polyethylene in the making of spunbonded webs or fabrics) enables one to utilize the high molecular weight linear polyethylene in the demanding processing conditions of spunbonding while substantially maintaining the inherent strength of the resin. This strength, when evaluated in fiber form and in bonded fabric form, improves by as much as about 60%. The strengths of thermally bonded fabric made from these higher molecular weight blended resins, approach the strength of typical commercial polypropylene-based fabrics by as much as about 60% or more.

The spunbonded webs or fabrics prepared using the blends of the present invention can be made wettable by incorporating into one or both of the polymers certain additives such as in U.S. Pat. No. 4,578,414. Furthermore, the addition of minor amounts of additives, such as colorants, pigments, and the like is within the purview of the present invention.

The webs or fabrics made using the present blends exhibit excellent softness, good gamma irradiation stability, high strength, and good thermal bondability to itself and to other thermoplastic films or webs, such as other polyolefins.

The ratio of high molecular weight linear polyethylene to low molecular weight linear polyethylene is largely dependent on the MFR of each. Generally, the amount of low molecular weight polymer used in modifying the high molecular weight polymer is desirably about the minimum about needed to render the high molecualr weight polymer processable at the desired spinning rate and denier size. Conversely, the amount of high molecular weight polymer added to the low molecualr weight polymer is desirably an amount needed to render the low molecular polymer processable at the desired spinning rate and denier size.

The following examples illustrate some embodiments of the present invention, but the invention is not limited to the particular embodiments shown.

EXAMPLE 1

A high molecular weight LLDPE copolymer (ethylene/1-octene) having a density of about 0.930 g/cm$^3$ and a MFR of about 18 is dry blended, in particulate form, with a low molecular weight LLDPE copolymer (also ethylene/1-octene) having a density of about 0.930 and a MFR of about 205, with the latter comprising about 10% by wt. of the blend. The blend is fed into an extruder for melt-mixing and conveyed to the spin unit where the polymer melt blend is spun into fine filaments and melt drawn at high velocities typically used in spunbonding. The apparatus is specifically designed for this kind of operation and enables the polymer to undergo rapid draw down (from 600 micrometers to about 20 micrometers filament diameter) and rapid acceleration to about 4000 meters/min. in the space of about 3 meters.

The blend is spun at a throughput of about 1.2 g/min/hole, a linear spinning velocity of 4045 m/min, and a polymer melt temperature of about 195° C. The measured titer of the filaments formed under these conditions is about 2.7 denier filament. The physical properties include a tenacity of about 1.49 g/denier and elongation at break of about 163%. Optimized bonded fabric strips exhibit tensiles (tenacity) of about 2400 grams at break (normalized to one ounce per square yard fabric weight). The fabric tenacity is about 52% of the tenacity of the polypropylene tenacity, 4699, shown in Examples 8 and 11 below. In contrast to this the above-described LLDPE, with MFR of 18, when unblended exhibits a linear spinning velocity of only up to 3205 meters/min before excessive fiber breakage occurs and the fiber denier is above 3.

A test on the above polymer blend is performed as follows:

Fibers are collected continuously onto spools using a throughput rate necessary to achieve about the same denier per filament. Polymer temperature stays the same as above. The air gun is not used in this test because of the randomization of the filament splay and the difficulty in separation of individual filaments. After collection of sufficient sample size, the fibers are cut off of the collection spool and cut into 1.5-inch staple fibers. One and one quarter gram samples of these 1.5-inch staple fibers are weighed out and formed into slivers using a Roto Ring (manufactured by Spinlab, Inc.); a sliver is an ordered collection of fibers such that the fiber ends are randomized while the fibers themselves are all paralleled. The structure is about four inches wide by about ten inches long after gently opening the sliver tow. This opened sliver tow is then fed into a Beloit Wheeler calender bonder for thermal tie down of the filaments where pressure and temperature are adjusted for optimal bonding conditions and fabric strength.

The fibers produced from the blend described above are found to have optimum bonding conditions at a top roll (or embossed roll with about 20% land area) temperature of about 114° C. and a bottom roll (smooth roll) temperature of about 117° C. The bonding pressure is found to be optimal at about 700 psig or about 199 pli (pounds per linear inch). After forming a sufficient number of thermally bonded fabrics under the same bonding conditions, a single sample is cut out of each bonded strip which measures 1 by 4 inches. These samples are individually weighed and then tensiled by use of an Instron tensile tester affixed with a data systems adapter for measuring and recording load and displacement. The mean value of the force required to break this 1 by 4 inch fabric strip, normalized to one ounce per square yard weight, is about 2397 grams bonded fabric tenacity, with a standard deviation of about 8.7%. The percent strain at peak (elongation) of these fabrics average 41% with a standard deviation of 4%.

Examples 2-11 which follow are done in substantially the same manner as Example 1.

EXAMPLE 2 (For Comparison With The Present Invention)

A commercially available LLDPE (eth/octene) having a MFR value of about 30 and a density of about 0.940 g/cm$^3$ is spunbondable using throughputs of about 1.2 gm/min./hole on a spinneret, at a linear velocity of about 4481 meters/min., and high air pressure to produce filaments of about 2.4-denier. Fabric made from resulting fiber has 1" (2.54 cm) strip tensile strength of 1531 grams-to-break, which is less than 35% of the tenacity (about 4700) of a fabric from a commercially available fiber-grade polypropylene.

EXAMPLE 3

A blend comprising 50% by wt. of HDPE (52 MFR, 0.953 density) and 50% by wt. of LLDPE (eth/octene, 12 MFR, 0.936 density) is found to have a bonded web peak strip tensile of about 2400 gms.

EXAMPLE 4 (for comparison: not claimed invention)

A LLDPE (ethylene/octene) having a MFR of 105 and a density of 0.953 is found to have a maximum bonded web tensile strength of 1450 gms. The bonded web is formed using an embossing roll at 236° F. (about 113° C.) and a smooth roll at 240° F. (about 116° C.) at a bonding pressure of 75 PLI (pounds per linear inch).

EXAMPLE 5 (for comparison; not claimed invention)

A LLDPE (ethylene/octene) having a MFR of 105 and density of 0.93 is found to have a maximum bonded web tensile strength of 1066 gms. The bonded web is formed using an embossing roll at 224° F. (about 107° C.) and a smooth roll at 228° F. (about 109° C.) at a bonding pressure of 75 PLI.

EXAMPLE 6

A blend comprising 90% by wt. of LLDPE (ethylene/octene, 18 MFR, 0.93 density) and 10% by wt. of LLDPE (ethylene/octene, 105 MFR, 0.93 density) is found to have a peak bonded fabric tenacity of 2061 gms. By calculation the blend has 22 MFR and 0.93 density.

EXAMPLE 7

A blend commprising 90% by weight of LLDPE (ethylene/octene, 18 MFR, 0.93 density) and 10% by weight LLDPE (ethylene/octene, 205 MFR, 0.93 density) is used in making a bonded web (fabric) at 236° F. (embossed roll) and 240° F. (smooth roll) at 200 PLI bonding pressure is found to have a gms force at break of 2073. The same blend is used in making a bonded fabric (web) at 238° F. (embossed roll) and 242° F. (smooth roll) at 200 PLI and is found to have a gms. force at break of 2398.

EXAMPLE 8 (for comparison; not claimed invention)

A commercially available fiber-grade polypropylene (PP) is spun into fibers and made into a heat-bonded fabric. The PP had a 15.6 MFR (@190° C.) and 0.91 density. The following data indicates tenacity and temperature for 5 tests:

|  | 1 | 2 | 3 | 4 | 5 |
|---|---|---|---|---|---|
| Bonding Temp. °F. (embossed/smooth) | 280/284 | 280/284 | 284/288 | 288/292 | 292/296* |
| PLI | 75 | 224 | 200 | 200 | 200 |
| Gms. Force at Break (normalized) | 2980 | 3485 | 4699 | 4307 | 3881 |

EXAMPLE 9

A blend comprising 50% by weight of LLDPE (12 MFR, 0.935 density) and 50% by weight of LLDPE (105 MFR, 0.053 density) is spun into fibers and a bonded web (fabric) is obtained. The blend has a calculated MFR of 35.5 and density of 0.944. Bonding temperature and tenacity is shown below at different bonding pressures.

|  | 1 | 2 |
|---|---|---|
| Bonding Temp. °F. (embossed/smooth) | 244/248 | 244/248 |
| PLI | 75 | 200 |
| Gms. Force at Break (normalized) | 2355 | 2297 |

EXAMPLE 10

A blend comprising 70% by wt. of LLDPE (18 MFR, 0.93 density) and 30% by weight of LLDPE (105 MFR, 0.953 density) and having a calcualted MFR of 30.5 and density of 0.937, is spun into fibers and bonded as a fabric in 3 tests; data is shown below:

|  | 1 | 2 | 3 |
|---|---|---|---|
| Bonding Temp. °F. (embossed/smooth) | 238/242 | 240/244 | 242/246 |
| PLI | 200 | 200 | 200 |
| Gms. Force at Break (normalized) | 2190 | 2243 | 2586 |

EXAMPLE 11

The following blends of LLDPE prepared for use in accordance with the present invention:

| Resin | Blend Components | Calc. for Blend MFR | Density |
|---|---|---|---|
| A | 90% (18 MFR, 0.93 dens.) 10% (205 MFR, 0.93 dens.) | 23 | 0.93 |
| B | 95% (18 MFR, 0.93 dens.) 4.75% (205 MFR, 0.93 dens.) 0.25% (wetting agent)* | 20 | 0.93 |
| C | 90% (18 MFR, 0.93 dens.) 9.55% (205 MFR, 0.93 dens.) 0.5% (wetting agent)* | 22.4 | 0.93 |
| D | 90% (18 MFR, 0.93 dens.) 10% (205 MFR, 0.93 dens.) | 21.5 | 0.932 |

*The wetting agent is of the type disclosed in U.S. Pat. No. 4,578,114.

The above blends are compared with a commercially available fiber-grade polypropylene (PP) and with 3 different unblended LLDPE's, identifed in the following Table as PE-1, PE-2, and PE-3. PE-1 is an LLDPE (30 MFR, 0.94 density). PE-2 is an LLDPE (26 MFR, 0.94 density. PE-3 is an LLDPE (18 MFR, 0.93 density). The "Target" denotes the range or quantity sought to be reached, or surpassed, in a commercially-acceptable resin to compete well with the fabric strength attainable with fiber-grade polypropylene, or with the speed of draw and the fiber denier.

| Resin | Throughput gm/min./hole | Max. Velocity (M/min.) | Min. Denier | Bonded Fabric Tenacity |
|---|---|---|---|---|
| Target | 1-1.2 | ≧3500 | 2.5-3.0 | >2000 |
| PE-1 | 1.2 | 4481 | 2.41 | 1531 |
| PE-2 | 1.2 | 4900 | 2.2 | 1855 |
| PE-3 | 1.2 | 3200-3600 | 3-3.4 | 2327 |
| PP | 1.2 | 4150 | 2.6 | 4699* |
| A | 1.2 | 4045 | 2.7 | 2400 |
| B | 1.2 | 3576 | 3.0 | N.M.** |
| C | 1.2 | 4090 | 2.64 | N.M. |
| D | 1.2 | 3900 | 2.75 | ~2400 |

*Optimized bonding temperature (see Ex. 8) where range is 2980–4699).
**NM means not measured.

Note in the above Table that PE-1 and PE-2 met the "target" except for the tenacity. PE-3 met the tenacity target, but not the denier target and was marginal with respect to the velocity target. Resins A and D (blends of the present invention) met all the targets and were closer to the PP tenacity target than any of the others. Resins A, B, C, and D met or exceeded the fiber-forming requirements of the target.

In the foregoing examples, all blends involved were dry-blended and then fed directly into the fiber spinning extruder. However the blend of Example 13 below was melt-blended before being fed to the fiber spinning extruder. This illustrates the versatility of the polymers used in the present invention.

EXAMPLE 12 (for comparison; not example of claimed invention)

A LLDPE (ethylene/octene copolymer) having a MFR of about 30 gm/10 min. and a density of about 0.94 gm/cc is spun-bonded on large (commercial size) equipment at a rate of 1.2 gm/min./hole, and 3900 m/min. to obtain fibers at 2.75 denier, and an optimized fabric of tenacity (MD) of about 1370 grams.

EXAMPLE 13

A blend comprised of 90% LLDPE (18 MFR, 0.930 density) and 10% LLDPE (105 MFR, 0.953 density) is prepared which exhibits a MFR of about 21.5 and a density of about 0.932. It is spunbonded on large (commercial size) equipment at a throughput of 1.2 gm/min./hole, and velocity of 3900 m/min., to obtain fibers of about 2.75 denier, and an unoptimized fabric tenacity of about 1600, which is about 15% improvement over the optimized fabric tenacity of the unblended 30 MFR, 0.940 density LLDPE of Example 12 above which is also spun on commercial size equipment. The fabric made from the blend rebonded to simulate optimized bonding, resulted in a fabric tenacity of about 2081 gms.

We claim:

1. A spunbonded fabric of web prepared from a blend of linear polyethylenes suitable for spunbonding at throughput rates of about 1.0 to about 1.2 grams/minute/hole, at linear spinning velocities of at least about 3500 meters per minute, to produce fiber sizes of less than 3.0 denier/filament, said blend comprising high molecular weight linear polyethylenes having a MFR value within the range between about 0.5 to 25 g/10 min. and a density above about 0.91 g/cm$^3$, and low molecular weight linear polyethylene having a MFR value within the range of greater than 25 to about 300 g/10 min. and a density above about 0.91 g/cm$^3$, said spunbonded fabric or web being prepared therefrom and exhibiting improved properties over that similarly prepared from the high molecular weight linear polyethylene alone.

2. The spunbonded fabric or web of claim 1 wherein the ratio of the high molecular weight linear polyethylene and low molecular weight linear polyethylene is sufficient to provide a blend having a MFR value in the range of about 25 to about 100 g/10 min. and a density of about 0.91 to about 0.96 g/cm$^3$.

3. The spunbonded fabric or web of claim 1 wherein the high molecular weight linear polyethylene is LLDPE having a MFR value within the range between about 0.5 and 25 g/10 min., the low molecular weight linear polyethylene is LLDPE having a MFR value within the range of greater than to about 300 g/10 min., and wherein the blend has a MFR value in the range of about 25 to about 100 g/10 min.

4. The spunbonded fabric or web of claim 1 wherein each of the linear polyethylenes comprises a copolymer of ethylene with at least one $C_3$–$C_{12}$ olefin.

5. The spunbonded fabric or web of claim 1 wherein each of the linear polyethylenes comprises a copolymer of ethylene with at least one $C_4$–$C_8$ olefin.

6. The spunbonded fabric or web of claim 1 wherein at least one of the linear polyethylenes is a copolymer of ethylene and octene.

7. The spunbonded fabric or web of claim 1 wherein each of the linear polyethylenes is a copolymer of ethylene and octene.

8. In a process wherein molten LLDPE polymer is spunbonded to make a web or fabric, the improvement wherein the LLDPE comprises a blend of high molecular weight LLDPE and low molecular weight LLDPE spunbondable at a throughput rate of about 1.0 to about 1.2 grams/minute/hole, using a linear spinning velcocity of at least about 3500 meters per minute, and at a fiber size of smaller than 3 denier/filament, thereby producing a web or fabric having improved strength over that obtained by similarly spunbonding a web or fabric of the high molecular weight LLDPE alone, wherein said high molecular weight LLDPE has a MFR below 25 g/10 min., and wherein said low molecular weight LLDPE has a MFR above 25 g/10 min.

9. The process of claim 8 wherein the high molecular weight LLDPE has a MFR below about 20 and the low molecular weight LLDPE has a MFR greater than about 40.

* * * * *

UNITED STATES PATENT AND TRADEMARK OFFICE
CERTIFICATE OF CORRECTION

PATENT NO. : 4,842,922

DATED : June 27, 1989

INVENTOR(S) : Stephen P. Krupp, Edward N. Knickerbocker, John O. Bieser

It is certified that error appears in the above-identified patent and that said Letters Patent is hereby corrected as shown below:

Column 5, line 15; change "about" to read --amount--.

Column 5, line 16; change "molecualr" to read --molecular--.

Column 5, line 19; change "cualr" to read --cular--.

Column 5, line 47; change "denier filament." to read --denier per filament.--.

Column 7, line 41; change "0.053" to read --0.953--.

Column 7, line 59; change "calcualted" to read --calculated--.

Column 8, line 19; change "9.55%" to read --9.5%--.

Column 8, line 22; change "(205" to read --(105--.

Column 8, line 22; change "0.93 dens.)" to read --0.953 dens.)--.

Column 8, line 47; change "(see Ex. 8)" to read --(See Ex. 8--.

Column 10, line 9; change "than to" to read --than 25 to--.

Signed and Sealed this

Fourteenth Day of July, 1992

*Attest:*

DOUGLAS B. COMER

*Attesting Officer*  *Acting Commissioner of Patents and Trademarks*